United States Patent
Russell (10) Patent No.: US 9,989,371 B1
(45) Date of Patent: Jun. 5, 2018

(54) DETERMINING HANDOFF CHECKPOINTS FOR LOW-RESOLUTION ROBOT PLANNING

(71) Applicant: X Development LLC, Mountain View, CA (US)

(72) Inventor: Jared Stephen Russell, San Francisco, CA (US)

(73) Assignee: X DEVELOPMENT LLC, Mountain View, CA (US)

(*) Notice: Subject to any disclaimer, the term of this patent is extended or adjusted under 35 U.S.C. 154(b) by 0 days. days.

(21) Appl. No.: 15/602,425

(22) Filed: May 23, 2017

Related U.S. Application Data (63) Continuation of application No. 14/861,852, filed on Sep. 22, 2015, now Pat. No. 9,689,696.

(51) Int. Cl.
| | |
|---|---|
| *G01C 21/34* | (2006.01) |
| *B25J 5/00* | (2006.01) |
| *B25J 9/16* | (2006.01) |
| *B25J 13/00* | (2006.01) |

(52) U.S. Cl.
CPC .......... *G01C 21/3438* (2013.01); *B25J 5/00* (2013.01); *B25J 9/1666* (2013.01); *B25J 13/006* (2013.01); *G01C 21/3446* (2013.01); *Y10S 901/01* (2013.01)

(58) Field of Classification Search
CPC .... G01C 21/3438; G01C 21/3456; B25J 5/00; B25J 9/1666; B25J 13/006
USPC .......................................................... 701/527
See application file for complete search history.

(56) References Cited

U.S. PATENT DOCUMENTS

| | | | |
|---|---|---|---|
| 8,651,206 B2* | 2/2014 | Slawinski | B60L 15/40 180/167 |
| 2008/0027599 A1* | 1/2008 | Logan | G05D 1/0234 701/23 |
| 2008/0086241 A1* | 4/2008 | Phillips | G05D 1/0038 701/2 |

(Continued)

OTHER PUBLICATIONS

Zhang, H., et al. (May 2012). Combining Global and Local Planning with Guarantees on Completeness. In Robotics and Automation (ICRA), 2012 IEEE International Conference on (pp. 4500-4506). IEEE.

(Continued)

Primary Examiner — Yazan Soofi
(74) Attorney, Agent, or Firm — Middleton Reutlinger (57) ABSTRACT

Methods, apparatus, systems, and computer-readable media are provided for determining and assigning intermediate handoff checkpoints for low-resolution robot planning. In various implementations, a global path planner may identify a task to be performed by a robot in an environment. In various implementations, the global path planner may determine, based at least in part on one or more attributes of the environment or the task, an intermediate handoff checkpoint for the robot to reach by a scheduled time while the robot performs the task. In various implementations, the global path planner may determine that a measure of reactivity that would be attributable to the robot upon the robot being assigned the intermediate handoff checkpoint satisfies a reactivity threshold. In various implementations, the global path planner may provide, to a local path planner associated with the robot, data indicative of the intermediate handoff checkpoint.

20 Claims, 9 Drawing Sheets

(56) References Cited

U.S. PATENT DOCUMENTS

| | | | | |
|---|---|---|---|---|
| 2009/0234499 | A1* | 9/2009 | Nielsen | B25J 9/161 700/250 |
| 2011/0106339 | A1* | 5/2011 | Phillips | G05D 1/0033 701/2 |
| 2012/0095619 | A1* | 4/2012 | Pack | G05D 1/0038 701/2 |
| 2013/0268118 | A1* | 10/2013 | Grinstead | B25J 19/023 700/259 |

OTHER PUBLICATIONS

Gochev, K., et al. (May 2011). Path Planning with Adaptive Dimensionality. In Fourth Annual Symposium on Combinatorial Search; 8 pages.

Thrun, S., et al. (1998). Map Learning and High-Speed Navigation in RHINO. AI-based Mobile Robots: Case Studies of Successful Robot Systems. MIT Press, Cambridge, MA; 24 pages.

Subramanian, M., et al. (2014). A Study on Seamless Information Sharing between Robots in Identifying the Optimal Path: An Agent based Approach. (pp. 226-235).

Caglioti, V., et al. (Jun. 2006). Cooperative, Distributed Localization in Multi-Robot Systems: A Minimum-Entropy Approach. In Distributed Intelligent Systems: Collective Intelligence and Its Applications, 2006. DIS 2006. IEEE Workshop on (pp. 25-30). IEEE.

* cited by examiner

DETERMINING HANDOFF CHECKPOINTS FOR LOW-RESOLUTION ROBOT PLANNING

BACKGROUND

Semi-autonomous and autonomous robots often may operate in environments that are considered "dynamic" because various attributes of the environment, such as locations of obstacles, locations of other robots, or other hazards (e.g., people), etc., may change. To cope with a changing environment, each robot should have the ability to perform its assigned task and yet have sufficient autonomy to also perform obstacle avoidance when necessary. A semi-autonomous or autonomous robot's computing resources, such as memory and processor cycles, may be heavily utilized to properly react to unforeseen obstacles and/or hazards in its own vicinity while still performing its assigned task. Thus, in a complex dynamic environment, it may be impracticable for each robot to have or be provided comprehensive, or even extensive, knowledge of changing environmental attributes. Accordingly, various techniques exist for performing high level (i.e. low resolution) robotic path planning at a global level, e.g., by a global path planner, and for performing low level (i.e. high resolution) robotic path planning at a local level, e.g., by a local path planner implemented on the robot itself. However, existing techniques may not take into account changing attributes of the robot environment that are detected by the global planner and/or desired "reactivity" of the robots.

SUMMARY

The present disclosure is generally directed to methods, apparatus, and computer-readable media (transitory and non-transitory) for determining handoff checkpoints for low resolution robot planning. A global path planner may analyze various attributes of tasks assigned to a plurality of robots, as well as an environment in which the robots operate, to determine relatively low resolution plans (e.g., paths) for the plurality of robots to follow to perform their respective tasks. The global path planner may also determine and assign handoff checkpoints to be reached by respective robots by scheduled times while performing the respective robot tasks. Each of the plurality of robots may be associated with a local path planner, which in many instances may be implemented on the robot itself. A local path planner associated with a robot may perform high resolution planning for the robot that comports with the handoff checkpoint(s) determined and assigned by the global path planner. So long as each robot reaches the handoff checkpoints assigned to it by scheduled times, the robot may otherwise have autonomy to operate in any manner its local path planner sees fit, e.g., to avoid unexpected obstacles and/or hazards, and/or to account for potentially-changing kinematic constraints of the robot itself.

In some implementations, a method may be provided that includes: identifying, by a global path planner implemented by a computing system, a task to be performed by a given robot of a plurality of robots in an environment, wherein the plurality of robots are in communication with the global path planner; determining, by the global path planner, a first intermediate handoff checkpoint for the given robot to reach while the given robot performs the task; transmitting, by the global path planner over one or more networks, to a local path planner associated with the given robot, data indicative of the first intermediate handoff checkpoint; determining, by the global path planner, a second intermediate handoff checkpoint for the given robot to reach consecutively after the given robot meets the first intermediate handoff checkpoint while the given robot performs the task, wherein a spatial or temporal difference between the first and second intermediate handoff checkpoints is selected based on one or more attributes of the environment; transmitting, by the global path planner over one or more of the networks, to the local path planner associated with the given robot, data indicative of the second intermediate handoff checkpoint; wherein transmitting the first and second intermediate handoff checkpoints causes the given robot to operate in a manner in which the given robot consecutively reaches the first and second intermediate handoff checkpoints.

In various implementations, the one or more attributes of the environment may include a latency associated with a communication channel between the global path planner and the local path planner. In various implementations, the one or more attributes of the environment may include dropoff characteristics associated with a communication channel between the global path planner and the local path planner. In various implementations, the one or more attributes of the environment may include a level of entropy in the environment. In various implementations, the one or more attributes of the environment may include an observed change in a level of entropy in the environment. In various implementations, the one or more attributes of the environment may include an observed change in the environment.

In various implementations, the method may further include including, by the global path planner, in the data indicative of the second intermediate handoff checkpoint, an amount of precision about how the local path planner is to operate the robot to reach the second intermediate handoff checkpoint, wherein the amount of precision is commensurate with an amount of knowledge the global path planner has about the environment or the task.

Other implementations may include a non-transitory computer readable storage medium storing instructions executable by a computing system and/or one or more processors to perform a method such as one or more of the methods described above. Yet another implementation may include a system, such as a robot or robot management system, that includes memory and logic operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
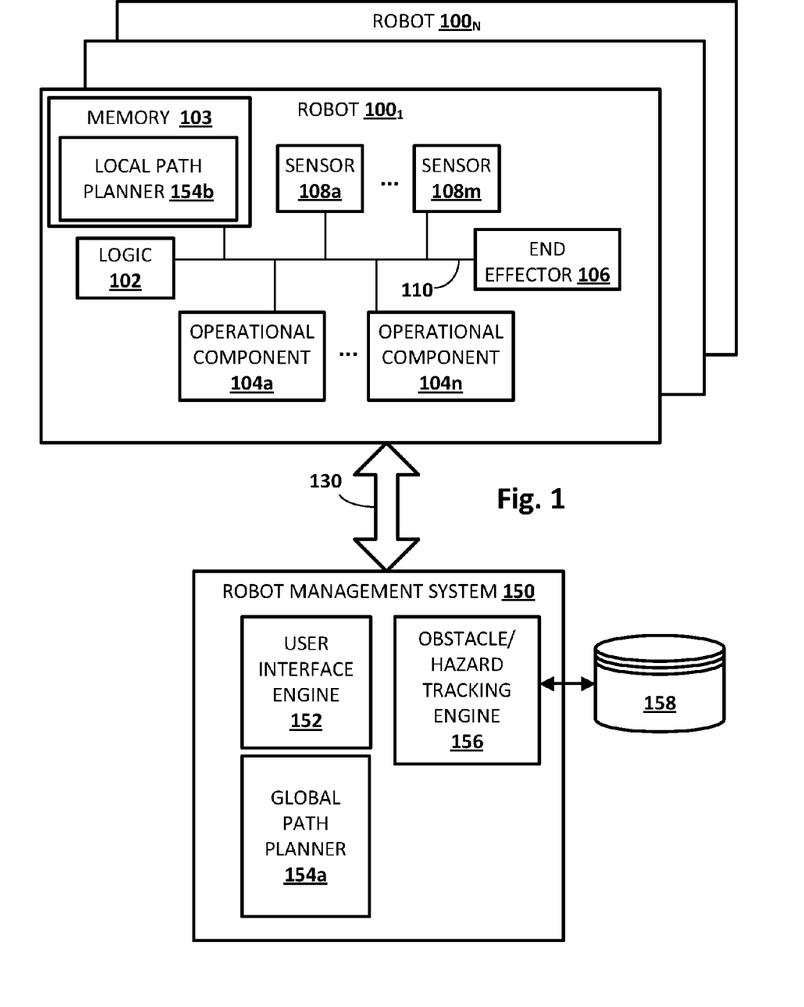
FIG. 1 schematically depicts an example environment in which disclosed techniques may be implemented, in accordance with various implementations.

FIG. 1 schematically depicts an example environment in which disclosed techniques may be implemented to at least partially control one or more at least semi-autonomous robots $100_{1-N}$, in accordance with various implementations. Each of robots $100_{1-N}$ may take various forms, including but not limited to a telepresence robot, a robot arm, a humanoid, an animal, an insect, an aquatic creature, a wheeled device, a submersible vehicle, an unmanned aerial vehicle ("UAV"), and so forth. Each robot may include logic 102 operably coupled to memory 103 (e.g., RAM, ROM, DRAM, flash, etc.), one or more operational components 104a-n, one or more end effectors 106, and one or more sensors 108a-n via one or more buses 110. Logic 102 may, in various implementations, include one or more processors, such as one or more so-called "real time processors" that are guaranteed to perform various operations within various temporal constraints.

As used herein, "operational components" 104 of a robot may refer to actuators, motors (e.g., servo motors), joints, shafts, gear trains, wheels, tracks, pumps (e.g., air or liquid), pistons, drives, or other components that may create and/or undergo propulsion, rotation, and/or motion to move components of robot 100 relative to each other, and/or to move robot 100 as a whole. Some operational components may be independently controllable, although this is not required. In some instances, the more operational components robot 100 has, the more degrees of freedom of movement it may have.

As used herein, "end effector" 106 may refer to a variety of tools that may be operated by robot 100 in order to accomplish various tasks. For example, some robots may be equipped with various types of "grippers," including but not limited to "impactive" (e.g., "grab" objects using opposing digits), "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, and so forth.

Sensors 108 may take various forms, including but not limited to cameras, light sensors (e.g., passive infrared), pressure sensors, pressure wave sensors (e.g., microphones), proximity sensors, torque sensors, force sensors, radars, range finders, accelerometers, gyroscopes, compasses, position coordinate sensors (e.g., global positioning system, or "GPS"), speedometers, drop off sensors (e.g., to detect an edge of a raised surface), and so forth. While sensors 108a-m are depicted as being integral with robot 100, this is not meant to be limiting. In some implementations, sensors 108 may be located external to, but may be in direct or indirect communication with, robot 100, e.g., as standalone units or as part of a robot management system 150.

Robots $100_{1-N}$ may be controlled and/or managed to various degrees by robot management system 150. Robot management system 150 may include one or computing systems connected by one or more networks (not depicted) that control and/or manage operation of robots $100_{1-N}$ to various degrees. An example of such a computing system is depicted schematically in FIG. 9. In some implementations, these multiple computing systems may cooperate to provide a so-called "cloud" that, in effect, combines computing resources of each computing system into a pool, enabling more powerful and/or more data-intensive processing. Various modules or engines may be implemented as part of robot management system 150 as software, hardware, or any combination of the two. For example, in FIG. 1, robot management system 150 includes a user interface engine 152, a "global" path planner 154a and an obstacle/hazard tracking engine 156.

User interface engine 152 may be configured to receive, as input, commands from various sources, such as human technicians. User interface engine 152 may provide or otherwise make this input available to other components of robot management system 150. Additionally or alternatively, user interface engine 152 may provide one or more user interfaces, locally and/or distributed to remote computing devices (e.g., as interactive web pages), which may be operated by users such as technicians to perform various tasks, such as control robots $100_{1-N}$, provide input indicative of obstacles or hazards for obstacle/hazard tracking engine 156, and/or adjust various parameters related to global path planner 154a.

Global path planner 154a may be implemented on robot management system 150 and may be configured to plan, at a high level, a path, trajectory, or other operations to be implemented and/or performed by one or more robots $100_{1-N}$, and provide data indicative of those plans to local path planners 154b associated with robots $100_{1-N}$. The "high level" paths determined by global path planner 154a may be referred to herein as relatively "low resolution," or as being relatively "coarse." Global path planner 154a may calculate a robot plan based on a variety of constraints associated with a robot 100 and/or its assigned task, such as a starting point, an end point, desired task duration, associated kinematic constraints, etc., and/or an environment in which the robot 100 will be or is performing its task. Additionally or alternatively, global path planner 154a may calculate a robot plan with various goals in mind, such as reducing and/or minimizing wear and tear on a robot 100, reducing/minimizing extraneous robot movement (which may pose a danger to nearby persons or objects), minimizing path distance, minimizing path traversal time, optimizing a robot's ability to observe obstacles and/or hazards while travelling, and so forth.

Global path planner 154a may provide data indicative of the plans it creates to robots $100_{1-N}$ in various ways which provide each robot 100 with varying degrees of autonomy while still allowing the global path planner 154a to exert various levels of influence on each robot 100. For example, in various implementations, global path planner 154a may provide one or more intermediate handoff checkpoints to a local path planner 154b associated with the robot 100, along with one or more scheduled times for the robot 100 to reach the one or more handoff checkpoints. The robot 100 may be required, or at least expected with a threshold amount of confidence, to reach each handoff checkpoint by a respective scheduled time. Between handoff checkpoints, the robot 100 may have various degrees of autonomy.

Local path planner 154b may be implemented in memory 103 of a robot 100 by logic 102, or in some cases may be implemented on a computing system (not depicted) that is in communication with the robot 100. Local path planner 154b may be configured to determine, at a low level, a path, trajectory, or specific plan for its associated robot 100 that takes into account, in real time or in near real time, obstacles or other hazards that may arise, and/or changes in kinematic constraints associated with robot 100. The "low level" paths determined by local path planner 154b may be referred to herein as relatively "high resolution," or as being relatively "granular." Put another way, local path planner 154b may have broad discretion to operate robot 100 within the constraints that robot 100 reach the next intermediate handoff checkpoint assigned by global path planner 154a by a scheduled time.

In various implementations, handoff checkpoints may be calculated by global path planner 154a and provided to a local path planner 154b over one or more wireless or wired communication channels 130 available in the environment between robots $100_{1-N}$ and robot management system 150. Communication channels 130 may come in various forms, including but not limited to Wi-Fi, Bluetooth, cellular (e.g., 3G, 4G, 5G and beyond), proprietary radio and/or infrared communication protocols, and so forth. Local path planner 154b may then generally operate robot 100 to reach the next handoff checkpoint, but otherwise may operate 100 robot with wide discretion, e.g., to avoid dynamic obstacles, to account for changing robot kinematics and/or challenges associated with performance of the robot's task (e.g., the robot drops an object), and so forth. In some implementations, by the time robot 100 meets one handoff check point, global path planner 154a may have provided the next handoff checkpoint to local path planner 154b. That way, robot 100 can continue performing its task without pausing at each handoff checkpoint.

Obstacle/hazard tracking engine 156 may be configured to collect and maintain, e.g., in an index 158, records of static obstacles (e.g., furniture, inanimate objects) and/or dynamic obstacles (e.g., people, other robots, moving objects, etc.) and/or hazards (e.g., liquid spills, damaged floors, etc.) present in a robotic environment. Records of obstacles/hazards may be updated based on various sources. In some implementations, robots $100_{1-N}$ may utilize various sensors (e.g., cameras, range finders) to observe obstacles/hazards in an environment while they perform their routine duties, and may report those observations to obstacle/hazard tracking engine 156. In some implementations, a user may be able to interact with user interface engine 152 to provide obstacle/hazard tracking engine 156 with input indicative of a newly discovered or changed obstacle or hazard. Records of obstacles/hazards in index 158 may be used, e.g., by global path planner 154a, to create robot plans and determine intermediate handoff checkpoints associated with those plans. Additionally or alternatively, records of obstacles/hazards in index 158 may be used, e.g., by local path planner 154b, to calculate alternative paths around obstacles/hazards.

As noted in the background, global path planner 154a may generally have more extensive knowledge about the overall environment in which robots $100_{1-N}$ operate than robots $100_{1-N}$ may have themselves. This may be for a variety of reasons. Robots $100_{1-N}$ may each have considerably less computing resources (e.g., less memory, less powerful processors, fewer processors, etc.) available than global path planner 154a, which as mentioned above may be implemented in the cloud. Accordingly, it may not be practicable to ensure that each robot 100 has comprehensive knowledge about the environment. Indeed, it may not be necessary or desirable to provide each robot 100 with any more knowledge about the environment than is strictly necessary. In addition, global path planner 154a may be in communication with each robot 100 and therefore may be able to collect information about the environment in real time from robots $100_{1-N}$. By contrast, it may be impracticable for each robot 100 to be in direct communication with every other robot 100.

Accordingly, and using techniques described herein, global path planner 154a may manage, at a relatively high level using strategically-determined and assigned handoff checkpoints, operation of a plurality of robots $100_{1-N}$ based on its relatively extensive knowledge of the environment. At the same time, each individual robot 100 may be provided with sufficient autonomy to perform a task in a manner that takes into account unexpected obstacles, hazards, or other challenges. This may lead to more efficient path planning and robot operation than might be possible if paths are planned entirely at each robot 100. And if for some reason it becomes difficult or impractical for global path planner 154a to continue exerting a consistent level of influence on robots $100_{1-N}$, then global path planner 154a can, using techniques described herein, give robots $100_{1-N}$ more autonomy to perform their tasks.

Global path planner 154a may strategically determine and assign handoff checkpoints in accordance with various parameters. One parameter that may be considered by global path planner 154a is a spatial and/or temporal frequency (or "density") at which handoff checkpoints should be assigned. In some implementations, global path planner 154a may select a spatial and/or temporal frequency at which handoff checkpoints are assigned in order to satisfy various thresholds, such as a "reactivity threshold" described below.

Additionally or alternatively, another parameter that global path planner 154a may consider is a level of detail and/or precision of the data indicative of a handoff checkpoint that global path planner 154a generates and provides to local path planners 154b. The level of detail and/or precision may dictate how much discretion or autonomy robot 100 has to perform portions of its task that lie between handoff checkpoints. For example, data indicative of a handoff checkpoint may indicate whether the local path planner 154b should plan operation of a robot 100 to reach that handoff checkpoint according to a ten meter grid, a one meter grid, a ten centimeter grid, etc., and/or in continuous space. While precision of handoff checkpoint data and density or frequency of handoff checkpoints may be related, they are not identical. For example, it is possible to have a relatively sparse handoff checkpoint density, but each handoff checkpoint may impose relatively detailed and precise constraints on a robot 100 that is to reach that handoff checkpoint.

Another parameter that may be considered by global path planner 154a is an associated planning horizon. A planning horizon may dictate how far ahead temporally and/or spatially global path planner 154a plans handoff checkpoints. This planning horizon may be altered, for instance, based on one or more attributes of the environment and/or one or more tasks being performed by one or more robots 100.

Yet another parameter that global path planner 154a may consider is how many global path planners 154a are participating in planning. In some implementations, multiple global path planners 154a may be implemented, each configured to plan in a separate state space. For example, one global path planner 154a may be configured to determine and assign handoff checkpoints that cause robots to move around a two-dimensional plane (e.g., x/y, also referred to as "states") of an environment. Another global path planner 154a may be configured to determine and assign handoff checkpoints in three states (e.g., x/y/z). Yet another global path planner 154a may be configured to determine and assign handoff checkpoints in two dimensions (e.g., x/y) and in a robot orientation or pose dimension. Yet another global path planner 154*a* may be configured to determine and assign handoff checkpoints in two or three dimensions while also considering velocities of robots in each dimension. And so on.

The computational intensity (e.g., computation time) required to determine the best way for global path planner 154*a* to determine and assign handoff checkpoints to a particular robot 100 may vary dramatically depending on how the above-described parameters are taken into account by global path planner 154*a*. If global path planner 154*a* is planning for a high number of robots 100 in a relatively complex environment, it may be important that global path planner 154*a* not spend an inordinate amount of time planning a single handoff checkpoint for a single robot.

Additionally, the size of the data indicative of the handoff checkpoints that global path planner 154*a* generates and transmits to local path planners 154*b* is heavily dependent on how global path planner 154*a* accounts for these parameters. If the only communication channel between global path planner 154*a* and one or more local path planners 154*b* (e.g., hosted on a plurality of robots 100 operating in an environment) is through a single wireless (e.g., Wi-Fi) channel, it may be beneficial for global path planner 154*a* to be thoughtful about how much data it has to transmit each time it assigns a handoff checkpoint.

In various implementations, global path planner 154*a* may select how much detail/precision it includes in each assigned handoff checkpoint, as well as an amount of computing resources it is willing to spend generating each assigned handoff checkpoint, based on one or more attributes of the robot task. For example, a robot 100 deployed in the field may be assigned handoff checkpoints in a sparse (e.g., low density or frequency) manner, and each handoff checkpoint may have relatively low precision, but may also be highly discretized, and the robot 100 may operate satisfactorily.

Figure 2:
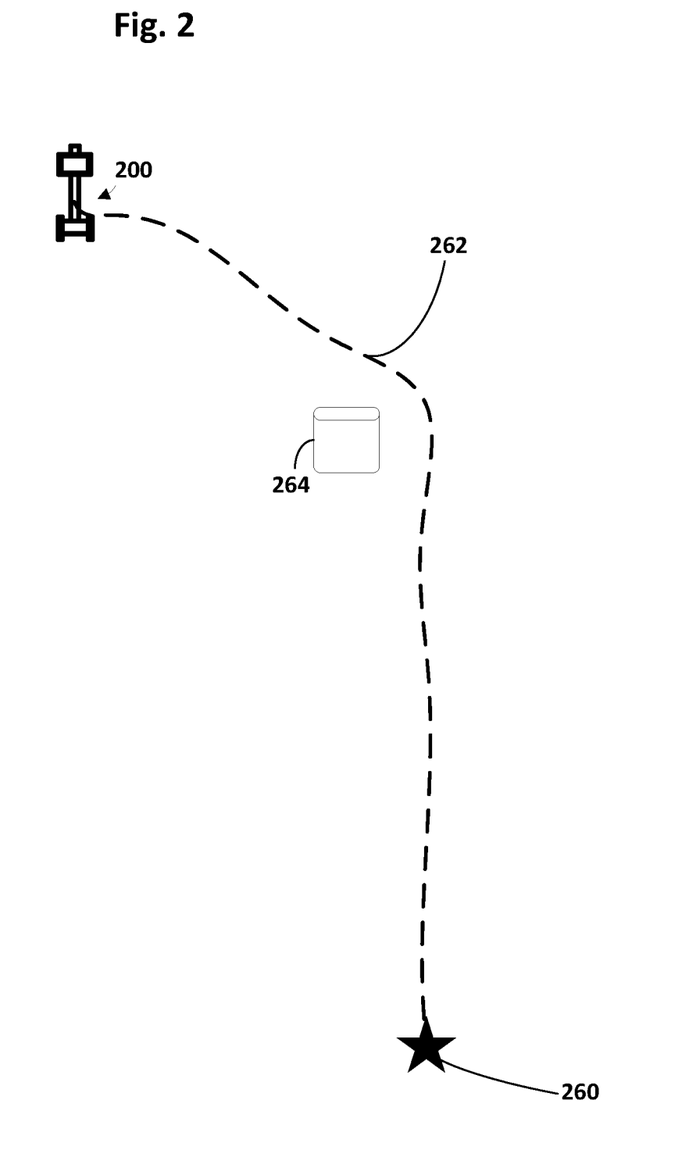
FIGS. 2 and 3 schematically depict an example of how a robot may operate autonomously between handoff checkpoints, in accordance with various implementations.

Referring now to FIG. 2, an example robot 200 (in the form of a telepresence robot) is depicted. Robot 200 may be assigned a task that requires it to travel to destination 260. Global path planner 154*a* has calculated a high-level path 262 that leads robot 200 to destination 260. For this example, it may be assumed that other than a static obstacle 264 (which global path planner 154*a* may learn about from obstacle/hazard tracking engine 156), global path planner 154*a* is unaware at the outset of any other static or dynamic obstacles that might affect how robot 200 performs its assigned task. Accordingly, global path planner 154*a* has planned high-level path 262 taking into account an attribute of the environment (obstacle 264) and one or more attributes of the task assigned to robot (travel to destination 260).

Figure 3:
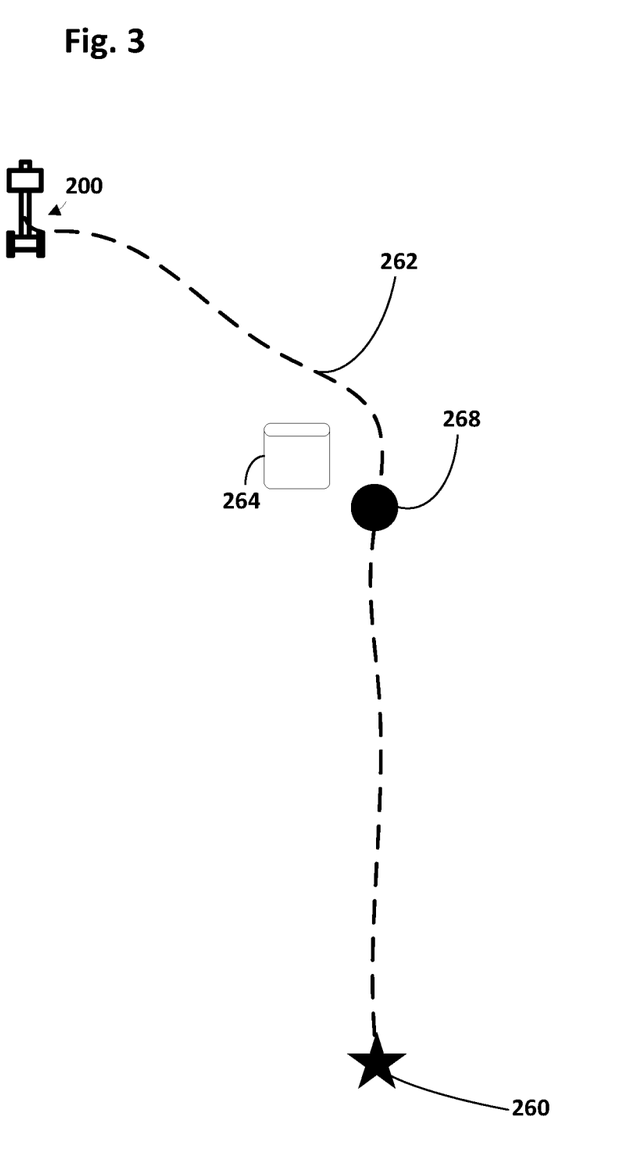

In FIG. 3, global path planner 154*a* has determined an intermediate handoff checkpoint 268 for robot 200 to reach by a scheduled time while robot 200 performs its task. In this example, handoff checkpoint 268 is approximately halfway along path 262. However, this is not meant to be limiting. As mentioned above and as will be explained further below, global path planner 154*a* may determine more or less handoff checkpoints (i.e., higher or lower density) for a high level path such as path 262 depending on the circumstances. Generally speaking, the more handoff checkpoints there are along a path (i.e., the higher the density), the more influence global path planner 154*a* is able to exert over robot 200 (or any of robots 100$_{1-N}$). By contrast, less handoff points farther apart from each other (spatially and/or temporally) may translate to less influence by global path planner 154*a* over robot 200.

Figure 4:
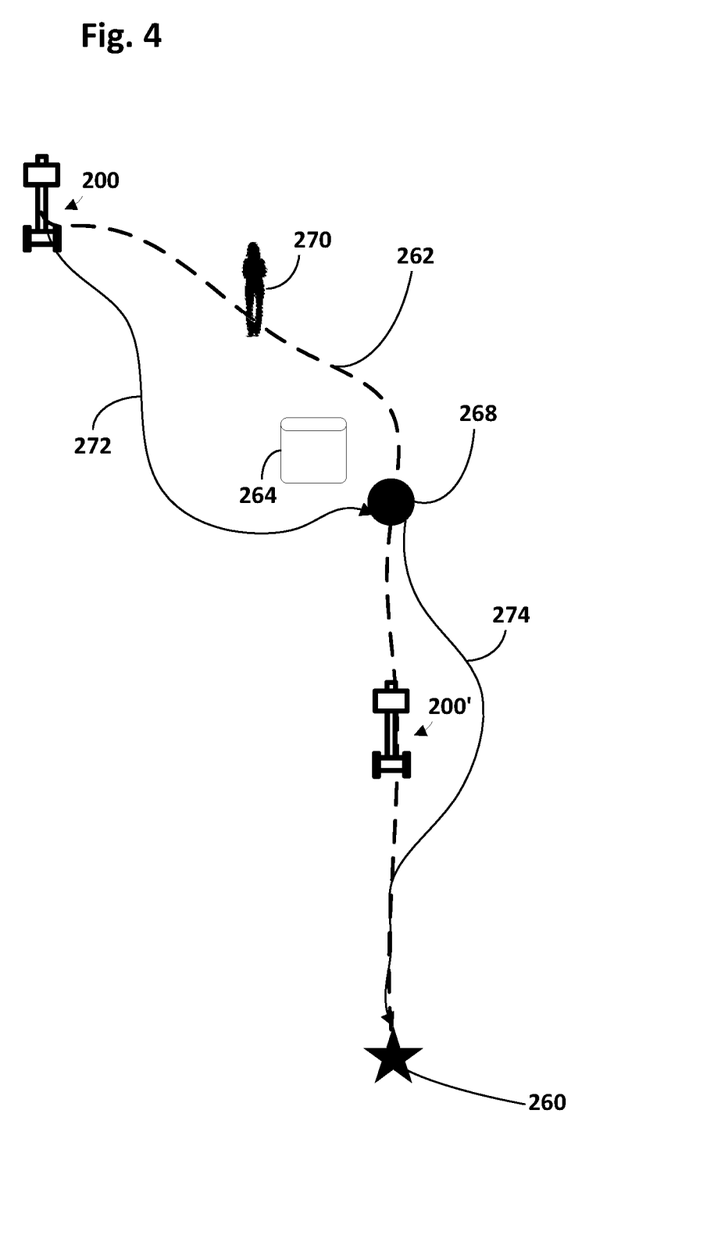
FIGS. 4, 5, 6, and 7 schematically depict an example of how handoff checkpoints may be determined differently depending on the circumstances, in accordance with various implementations.

FIG. 4 demonstrates how robot 200 has relative autonomy when traversing along path 262 from its starting position to handoff checkpoint 268, and from handoff checkpoint 268 to destination 260. For example, a dynamic obstacle 270 in the form of a person has blocked path 262 between the robot's starting point and handoff checkpoint 268. In response, robot 200, e.g., by way of a local path planner (e.g., 154*b* in FIG. 1), may determine and traverse a first alternative path 272 that avoids the dynamic obstacle 270 while still getting robot 200 to handoff checkpoint 268 by the scheduled time. Robot 200 similarly avoids another dynamic obstacle, this time in the form of another robot 200' that obstructs path 262 between handoff checkpoint 268 and destination 260, by determining and traversing another alternative path 274 that goes around robot 200' and then regains path 262 to arrive at destination 260 by the scheduled time. If robot 200 is unable to reach a handoff checkpoint by a scheduled time, global path planner 154*a* may take that into account when calculating (or recalculating) subsequent handoff checkpoints.

As noted above, global path planner 154*a* may schedule handoff checkpoints at various temporal and/or spatial distances from each other (i.e., at varying densities). There may be various tradeoffs associated with how frequently/densely handoff checkpoints are scheduled. Scheduling handoff checkpoints relatively far away from each other (spatially and/or temporally) may result global path planner 154*a* having fewer opportunities to influence a robot 100. On the other hand, having more time between handoff checkpoints may allow global path planner 154*a* to learn more about the environment (and changes to the environment) detected by various sensors, such as sensors carried by robots (e.g., 100$_{1-N}$, 200) in the environment. Knowing more about the environment may enable global path planner 154*a* to more intelligently calculate future handoff checkpoints.

Scheduling handoff checkpoints relatively close together may afford global path planner 154*a* more opportunities to influence a robot 100. But, it also may result in a robot 100 pausing at one handoff checkpoint while its corresponding local path planner 154*b* awaits receipt of the next handoff checkpoint from global path planner 154*a*. Additionally, having less time between handoff checkpoints may limit how much global path planner 154*a* can learn about the environment (and changes to the environment), which may lead to hastily-calculated and/or sub-optimal handoff checkpoints. Scheduling handoff checkpoints too close together may also strain computing resources available to global path planner 154*a*, and/or may require more time than is available between densely-packed handoff checkpoints.

In various implementations, measures of so-called "reactivity" may be attributable to robots (e.g., 100$_{1-N}$, 200) based on how often global path planner 154*a* has an opportunity to influence the robots. The more often global path planner 154*a* is able to influence operation of a robot 100, the greater measure of reactivity the robot 100 may have. The less often global path planner 154*a* is able to influence operation of a robot 100, the lower measure of reactivity the robot 100 may have. In various implementations, measures of reactivity that are attributable to robots upon the robots being assigned handoff checkpoints may be compared to a so-called "reactivity threshold" to determine whether the frequency at which global path planner 154*a* is able to influence individual robots 100 is satisfactory. In various implementations, a reactivity threshold may be established and/or adjusted based on the particular circumstances, as will be described below.

Using techniques described herein, handoff checkpoints may be calculated in a manner that balances maintaining desirable robot reactivity with having sufficient environmental knowledge to intelligently calculate the handoff checkpoints. For example, in various implementations, handoff checkpoints may be calculated that satisfy reactivity thresholds while also permitting global path planner 154a sufficient time to monitor the environment before calculating additional handoff checkpoints. In some implementations, handoff checkpoints may also be calculated to also satisfy so-called "reachability thresholds"—that is, a handoff checkpoint of a given task is reachable by the robot performing the task by the scheduled time with a threshold level of confidence.

The manner in which handoff checkpoints are determined and assigned may change depending on the circumstances. For example, changes to various attributes of an environment in which robots (e.g., $100_{1-N}$, 200) operate may warrant a change to how handoff points are determined and assigned. Some attributes of the environment that may be taken into account to determine handoff checkpoints include but are not limited to attributes of one or more communication channels (e.g., 130) between global path planner 154a and one or more local path planners 154b associated with one or more robots 100, a measure of entropy associated with the environment, new tasks assigned to robots, addition or subtraction of dynamic obstacles such as robots, and so forth.

Communication channel 130 may have various attributes, such as latency, drop out characteristics (e.g., frequency and/or duration of drop outs historically), and so forth, that may be considered, e.g., by global path planner 154a, when determining and assigning handoff checkpoints. For example, in some implementations, global path planner 154a may schedule handoff checkpoints sufficiently far apart temporally to account for a round trip latency between global path planner 154a and a local path planner 154b associated with a robot 100. Otherwise the robot 100 may have to pause to await the next handoff checkpoint. As another example, suppose a Wi-Fi signal in an environment in which a plurality of robots (e.g., $100_{1-N}$) operate suddenly degrades. Global path planner 154a may decrease a reactivity threshold so that it can schedule handoff checkpoints farther apart, enabling the robots to perform larger portions of their tasks autonomously, e.g., until the Wi-Fi signal improves. As yet another example, suppose an entropy of an environment in which a plurality of robots operates increases suddenly. Global path planner 154a may increase a reactivity threshold and schedule handoff checkpoints closer together, so that it is better able to account for rapid changes in the environment.

Figure 5:
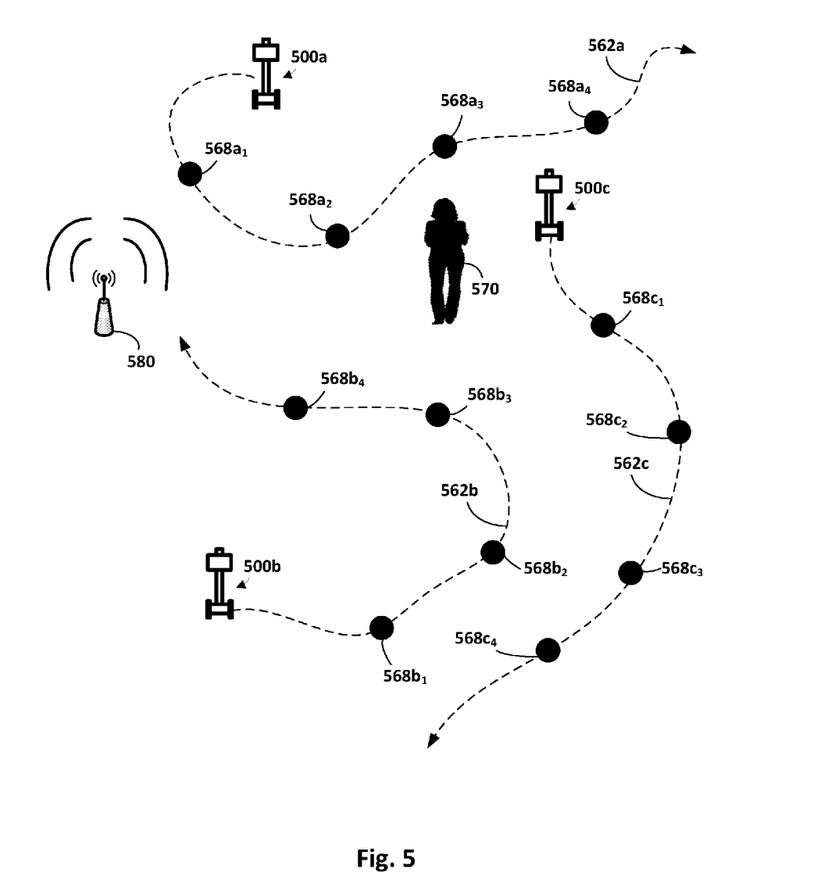

Referring now to FIG. 5, an example environment is depicted schematically in which three robots, 500a-c (depicted as telepresence robots), have had three respective low resolution paths planned for them, as indicated by the dashed paths at 562a-c, respectively. Various dynamic obstacles may be present in the environment, such as a person 570 and the robots 500a-c themselves. A wireless access point 580 is in wireless communication with each of the robots 500a-c, and in this example is emitting a relatively strong and/or stable signal. Global path planner (not depicted in FIG. 5, see 154a in FIG. 1) may take advantage of the robust communication channels available between it and robots 500a-c to exert relatively frequent influence on robots 500a-c. As noted above, doing so may enable global path planner 154a to ensure each robot 500 operates more efficiently by leveraging the relatively extensive knowledge global path planner 154a may have about the changing environment to micromanage each robot 500.

For example, the first path 562a of first robot 500a is projected to be divided into five segments by four handoff checkpoints $568a_1$-$568a_4$. The second path 562b of second robot 500b likewise is projected to be divided into five segments by four handoff checkpoints $568b_1$-$568b_4$. The third path 562c of third robot 500c likewise is projected to be divided into five segments by four handoff checkpoints $568c_1$-$568c_4$. "Projected to be . . . " refers to the fact that all four handoff checkpoints for a given path would not necessarily be calculated at once and/or ahead of time. Rather, handoff checkpoints may be calculated by global path planner 154a "on the fly" in response to changing environmental conditions. Of course, in some implementations, global path planner 154a may pre-calculate multiple handoff checkpoints for a given robot performing a given task ahead of time. If environmental and/or robot kinematic conditions do not change, these handoff checkpoints may be maintained. However, if environment and/or robot kinematic conditions change, global path planner 154a may be configured to alter and/or jettison pre-calculated handoff checkpoints in favor of newly calculated handoff checkpoints that account for the changes.

Figure 6:
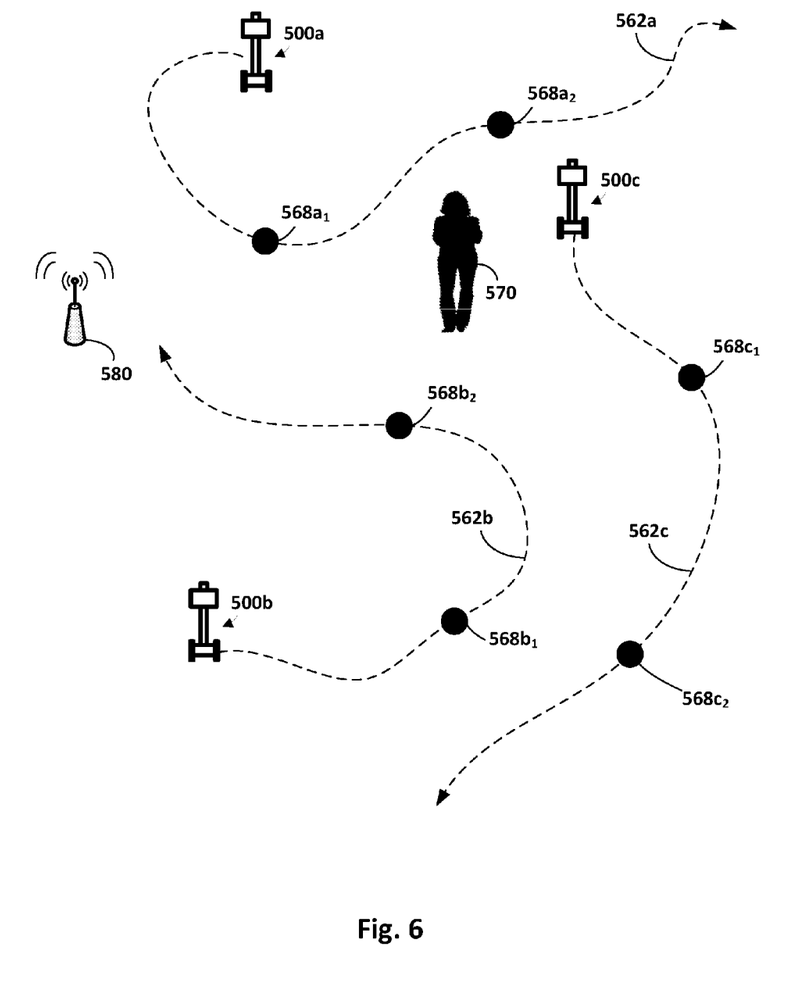

FIG. 6 depicts the environment of FIG. 5, except that the wireless signal emitted by access point 580 is degraded somewhat. This may decrease a likelihood that global path planner 154a is able to timely provide handoff checkpoints to robots 500a-c, which may result in robots 500a-c pausing to await future handoff checkpoints. Accordingly, global path planner 154a may decrease a reactivity threshold so that global path planner 154a has less frequent influence on robots 500a-c. For example, the first path 562a of first robot 500a is projected to be divided into three segments by two handoff checkpoints $568a_1$-$568a_2$. The second path 562b of second robot 500b likewise is projected to be divided into three segments by two handoff checkpoints $568b_1$-$568b_2$. The third path 562c of third robot 500c likewise is projected to be divided into three segments by two handoff checkpoints $568c_1$-$568c_2$. Having less frequent influence on robots 500a-c may decrease an ability of global path planner 154a to ensure each robot 500 operates in a manner that takes into account the most up-to-date information about the environment. But the tradeoff is that each robot 500 may have more autonomy to complete a larger portion of its tasks, and the likelihood that a robot will be stuck waiting for a next handoff checkpoint decreases. And at any rate, the degradation in the wireless signal provided by access point 580 may result in global path planner 154a receiving (e.g., from robots 500a-c) less information about changes to environmental attributes, which may limit its ability to intelligently determine and assign handoff checkpoints.

Figure 7:
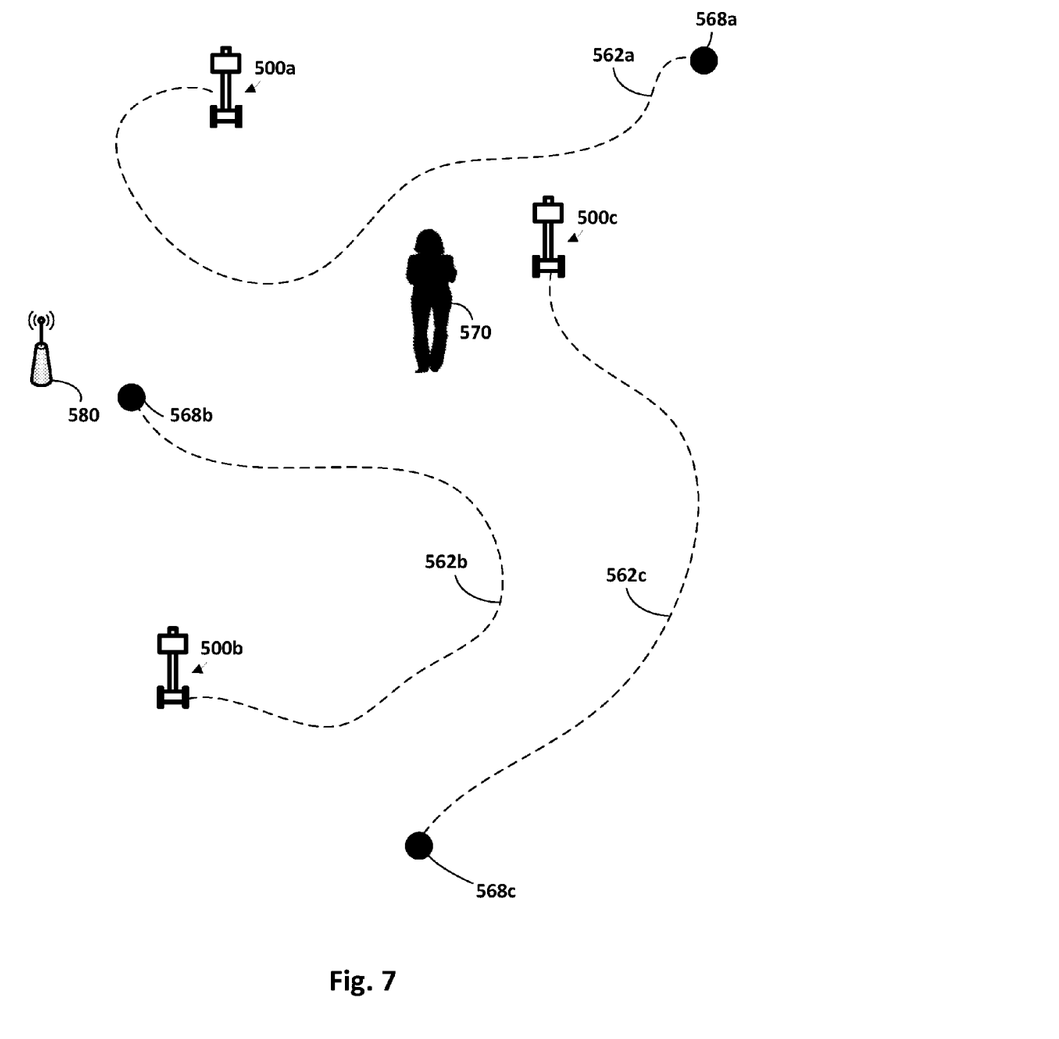

FIG. 7 depicts the same environment as FIGS. 5 and 6, except that wireless signal provided by access point 580 is unavailable or severely degraded. Because communication channels (130 in FIG. 1) available between global path planner 154a and robots 500a-c are severely limited, global path planner 154a only assigns a single handoff checkpoint to each robot 500, at the end of the respective path 562. Consequently, robots 500a-c may have almost complete autonomy to perform their respective tasks. Lacking comprehensive information about the environment and changes thereto, robots 500a-c may perform their tasks less efficiently than they did in FIG. 5 or 6. However, it may be preferable for robots 500a-c to operate inefficiently to robots 500a-c not operating at all because they are waiting for intermediate handoff checkpoints.

As mentioned previously, global path planner 154a may provide, as part of data indicative of an intermediate handoff checkpoint it provides to a local path planner 154b, varying amounts of precision about how local path planner 154b is to operate a robot 100 to meet the intermediate handoff checkpoint by a scheduled time. The amount of precision may be commensurate with an amount of knowledge global path planner 154a has about various attributes of an environment in which the robot 100 operates, and/or with an amount of knowledge global path planner 154a has about a task the robot 100 is performing.

For example, suppose global path planner 154a only has sparse knowledge of a corridor through which a robot 100 is to traverse to perform some task. Data provided by global path planner 154a to a local path planner 154b associated with the robot 100 may be limited, e.g., to a handoff checkpoint and a scheduled time for the robot 100 to reach the handoff checkpoint. Global path planner 154a may compute the scheduled time conservatively so that the local path planner 154b can have wide discretion to navigate the robot 100 to the handoff checkpoint, e.g., in a manner that takes into account local obstacles/hazards. On the other hand, if global path planner 154a has extensive knowledge of the corridor, it may provide the local path planner 154b with more precise instructions, and the local path planner 154b may have less discretion. In some implementations, global path planner 154a may additionally or alternatively determine and assign handoff checkpoints at a frequency/density that is commensurate with a level of knowledge it has about an environment and/or tasks assigned to robots operating in the environment.

Figure 8:
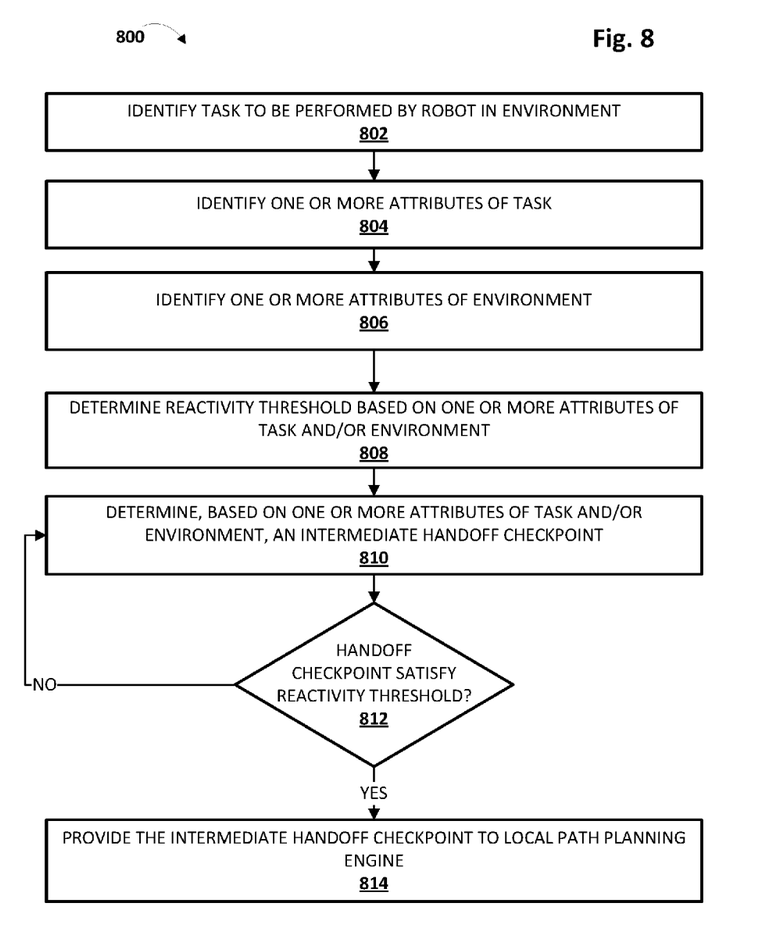
FIG. 8 depicts an example method, in accordance with various implementations.

Referring now to FIG. 8, an example method 800 of determining handoff checkpoints for low resolution robot planning is depicted. For convenience, the operations of flow charts are described with reference to a system that performs the operations. This system may include various components of various computer systems, including elements of robot 100 and/or robot management system 150. Moreover, while operations of method 800 are shown in a particular order, this is not meant to be limiting. One or more operations may be reordered, omitted, or added.

At block 802, the system (e.g., global path planner 154a) may identify a task to be performed by a robot (e.g., $100_{1-N}$, 200, 500). "Tasks" as used herein may refer to any number of operations, combinations of operations, and/or sequences of operations that may be performed by a robot. A task may be relatively simple, e.g., travel from point A to point B, follow person X, etc., or relatively complex, e.g., obtain object from location A, then manipulate or alter object, then travel to location B, then drop off object at location B, and then return to location A.

Many tasks may require a robot to traverse along a path, as demonstrated in FIGS. 2-7. However, this is not meant to be limiting. In other scenarios, a robot may remain relatively stationary to perform a task. For example, a robot that acts as part of an assembly line may remain at its workstation to perform one or more operations with one or more parts. In such a scenario, a global path planner may still determine and assign handoff checkpoints to the stationary robot. However, the handoff checkpoints assigned to a stationary robot may differ somewhat from those described above. For example, a handoff checkpoint may state that the robot is to have completed operations 1 through x of a particular sequence of operations. When determining and assigning handoff checkpoints to stationary robots, a global path planner may assign more weight to factors such as robot kinematics and/or dynamics, and less weight to changes in the surrounding environment (which may be less likely to impact a stationary robot). In some such implementations, a global path planner may only take a change to the environment into consideration when determining and assigning a handoff checkpoint to a stationary robot if a probability that the change will impact the robot's ability to perform its task satisfies a threshold. The same may be true when determining and assigning handoff checkpoints to non-stationary robots, although the threshold may be more easily satisfied in such situations.

Referring back to FIG. 8, once the task is identified at block 802, at block 804, the system may identify one or more attributes of the task. For example, the system may determine that the task to be performed by a robot has a relatively high likelihood of failure, such that the robot is likely going to have to make multiple attempts to do something and/or will require an unpredictable amount of time. For example, the robot's task may be to acquire or carry an object (such as an animal) with unknown and/or unpredictable physical characteristics, which may require multiple attempts. Alternatively, the system may determine that the task to be performed by a robot has a relatively low likelihood of failure, such that the robot is likely going to perform the task in a single attempt and/or in a predictable amount of time. Other task attributes which may be considered include but are not limited to expected or required velocity, expected power consumption, required or expected mechanical impedance (stiffness), and so forth.

At block 806, the system may identify various attributes about the environment. As noted above, attributes of the environment may include but are not limited to new or changing obstacles or hazards (e.g., addition of new robots or people), increased/decreased entropy, degraded or improved wireless signal, etc. Environmental attributes may be determined and added to index 158 from sensors carried by the robots themselves, e.g., while the robots perform their various tasks. Additionally or alternatively, the environmental attributes may be input into index 158 manually, e.g., by way of user interface engine 152.

At block 808, the system may determine a reactivity threshold based on one or more attributes of robot tasks determined at block 804 and/or one or more attributes of the environment determined at block 806. For example, and as demonstrated in FIGS. 5-7, if a wireless signal between a global path planner and local path planners operating robots degrades, a reactivity threshold may be decreased so that robots are able to perform greater portions of their tasks, rather than being hung up awaiting further handoff checkpoints. As another example, if entropy of the environment increases (and a wireless signal remains strong and not congested), a reactivity threshold may be increased so that a global path planner is able to exert more influence how each robot performs its task to work around the increased entropy. In other implementations, a reactivity threshold may be set manually.

At block 810, the system may determine, based on one or more attributes of robot tasks determined at block 804 and/or one or more attributes of the environment determined at block 806, one or more intermediate handoff checkpoints to assign to one or more robots. In some implementations, the system may identify one or more candidate handoff checkpoints and then calculate measures of reactivity (e.g., how much time between instances that the global path planner can influence a robot, how frequently the global path planner can influence a robot, etc.) that would be attributable to robots assigned those handoff checkpoints. For example, at block 812 of FIG. 8, the system may determine whether the handoff checkpoints satisfy the reactivity threshold, e.g., by comparing the measures of reactivity calculated for the candidate handoff checkpoints determined at block 810 to the reactivity threshold. If the answer at block 812 is no, then method 800 may proceed back to block 810. However, if the answer at block 812 is yes, then method 800 may proceed to block 814, where the system may provide data indicative of each handoff checkpoint and a scheduled time for a robot to meet the handoff checkpoint to one or more local path planning engines associated with one or more robots. In some implementations, the global path planner may transmit the data indicative of the one handoff checkpoint to the local path planner so that the local path planner receives the data indicative of the one handoff checkpoint prior to the robot reaching an immediately preceding handoff checkpoint by a scheduled time while the robot performs the task.

In other implementations, the system may not necessarily calculate measures of reactivity for each candidate handoff checkpoint. Instead, the system may select one or more candidate handoff checkpoints from a range of candidate handoff checkpoints known to satisfy the reactivity threshold, and may select from the candidates using other signals, such as probabilities the robots would be able to reach the candidate handoff checkpoints and whether those probabilities satisfy the aforementioned "reachability" thresholds.

Figure 9:
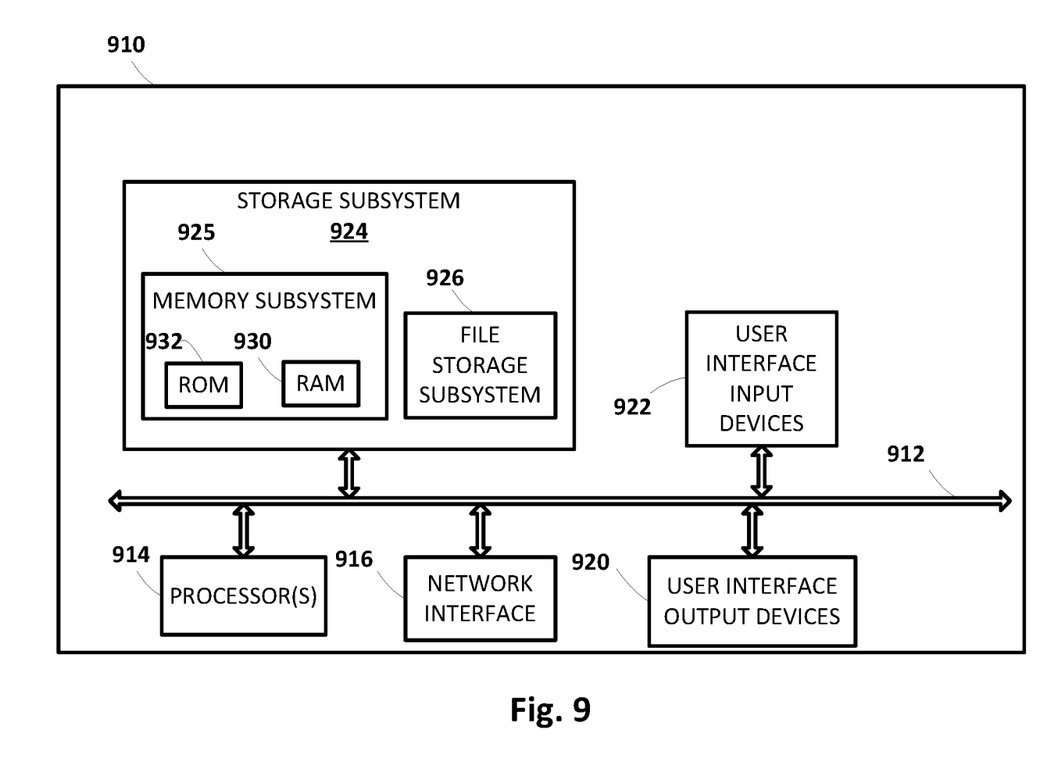
FIG. 9 schematically depicts an example architecture of a computer system.

FIG. 9 is a block diagram of an example computer system 910. Computer system 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computer system 410. Network interface subsystem 916 provides an interface to outside networks and is coupled to corresponding interface devices in other computer systems.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 910 to the user or to another machine or computer system.

Storage subsystem 924 stores programming and data constructs that provide the functionality of some or all of the modules described herein. For example, the storage subsystem 924 may include the logic to perform selected aspects of method 800, and/or to implement one or more aspects of robot 100 and/or robot management system 150. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a CD-ROM drive, an optical drive, or removable media cartridges. Modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computer system 910 communicate with each other as intended. Although bus subsystem 912 is shown schematically as a single bus, alternative implementations of the bus subsystem may use multiple busses.

Computer system 910 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 910 depicted in FIG. 9 is intended only as a specific example for purposes of illustrating some implementations. Many other configurations of computer system 910 are possible having more or fewer components than the computer system depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method comprising:
    identifying, by a global path planner implemented by a computing system, a task to be performed by a given robot of a plurality of robots in an environment, wherein the plurality of robots are in communication with the global path planner;
    determining, by the global path planner, a first intermediate handoff checkpoint for the given robot to reach while the given robot performs the task;
    transmitting, by the global path planner over one or more networks, to a local path planner associated with the given robot, data indicative of the first intermediate handoff checkpoint;
    determining, by the global path planner, a second intermediate handoff checkpoint for the given robot to reach consecutively after the given robot meets the first intermediate handoff checkpoint while the given robot performs the task, wherein a spatial or temporal difference between the first and second intermediate handoff checkpoints is selected based on one or more attributes of the environment; and transmitting, by the global path planner over one or more of the networks, to the local path planner associated with the given robot, data indicative of the second intermediate handoff checkpoint;

wherein transmitting the first and second intermediate handoff checkpoints causes the given robot to operate in a manner in which the given robot consecutively reaches the first and second intermediate handoff checkpoints.

2. The method of claim 1, wherein the one or more attributes of the environment comprise a latency associated with a communication channel between the global path planner and the local path planner.

3. The method of claim 1, wherein the one or more attributes of the environment comprise dropoff characteristics associated with a communication channel between the global path planner and the local path planner.

4. The method of claim 1, wherein the one or more attributes of the environment comprise a level of entropy in the environment.

5. The method of claim 1, wherein the one or more attributes of the environment comprise an observed change in a level of entropy in the environment.

6. The method of claim 1, wherein the one or more attributes of the environment comprise an observed change in the environment.

7. The method of claim 1, further comprising including, by the global path planner, in the data indicative of the second intermediate handoff checkpoint, an amount of precision about how the local path planner is to operate the robot to reach the second intermediate handoff checkpoint, wherein the amount of precision is commensurate with an amount of knowledge the global path planner has about the environment or the task.

8. A system comprising one or more processors and memory operably coupled with the one or more processors, wherein the memory stores instructions that, in response to execution of the instructions by one or more processors, cause the one or more processors to implement a global path planner that performs the following operations:

identifying a task to be performed by a given robot of a plurality of robots in an environment, wherein the plurality of robots are in communication with the global path planner;

determining a first intermediate handoff checkpoint for the given robot to reach while the given robot performs the task;

transmitting, over one or more networks, to a local path planner associated with the given robot, data indicative of the first intermediate handoff checkpoint;

determining a second intermediate handoff checkpoint for the given robot to reach consecutively after the given robot meets the first intermediate handoff checkpoint while the given robot performs the task, wherein a spatial or temporal difference between the first and second intermediate handoff checkpoints is selected based on one or more attributes of the environment; and transmitting, over one or more of the networks, to the local path planner associated with the given robot, data indicative of the second intermediate handoff checkpoint;

wherein transmitting the first and second intermediate handoff checkpoints causes the given robot to operate in a manner in which the given robot consecutively reaches the first and second intermediate handoff checkpoints.

9. The system of claim 8, wherein the one or more attributes of the environment comprise a latency associated with a communication channel between the global path planner and the local path planner.

10. The system of claim 8, wherein the one or more attributes of the environment comprise dropoff characteristics associated with a communication channel between the global path planner and the local path planner.

11. The system of claim 8, wherein the one or more attributes of the environment comprise a level of entropy in the environment.

12. The system of claim 8, wherein the one or more attributes of the environment comprise an observed change in a level of entropy in the environment.

13. The system of claim 8, wherein the one or more attributes of the environment comprise an observed change in the environment.

14. The system of claim 8, further comprising instructions to include, in the data indicative of the second intermediate handoff checkpoint, an amount of precision about how the local path planner is to operate the robot to reach the second intermediate handoff checkpoint, wherein the amount of precision is commensurate with an amount of knowledge the global path planner has about the environment or the task.

15. At least one non-transitory computer-readable medium comprising instructions that, in response to execution of the instructions by one or more processors, cause the one or more processors to implement a global path planner that performs the following operations:

identifying a task to be performed by a given robot of a plurality of robots in an environment, wherein the plurality of robots are in communication with the global path planner;

determining a first intermediate handoff checkpoint for the given robot to reach while the given robot performs the task;

transmitting, over one or more networks, to a local path planner associated with the given robot, data indicative of the first intermediate handoff checkpoint;

determining a second intermediate handoff checkpoint for the given robot to reach consecutively after the given robot meets the first intermediate handoff checkpoint while the given robot performs the task, wherein a spatial or temporal difference between the first and second intermediate handoff checkpoints is selected based on one or more attributes of the environment; and transmitting, over one or more of the networks, to the local path planner associated with the given robot, data indicative of the second intermediate handoff checkpoint;

wherein transmitting the first and second intermediate handoff checkpoints causes the given robot to operate in a manner in which the given robot consecutively reaches the first and second intermediate handoff checkpoints.

16. The at least one non-transitory computer readable medium of claim 15, wherein the one or more attributes of the environment comprise a latency associated with a communication channel between the global path planner and the local path planner.

17. The at least one non-transitory computer readable medium of claim 15, wherein the one or more attributes of the environment comprise dropoff characteristics associated with a communication channel between the global path planner and the local path planner.

18. The at least one non-transitory computer readable medium of claim 15, wherein the one or more attributes of the environment comprise a level of entropy in the environment.

19. The at least one non-transitory computer readable medium of claim 15, wherein the one or more attributes of the environment comprise an observed change in a level of entropy in the environment.

20. The at least one non-transitory computer readable medium of claim 15, wherein the one or more attributes of the environment comprise an observed change in the environment.

* * * * *